United States Patent Office 3,375,232
Patented Mar. 26, 1968

3,375,232
MODIFIED POLY(ARYLENE SULFIDE) RESINS
Roscoe A. Pike, Holden, and Randell E. Martin, Worcester, Mass., assignors to Norton Company, Worcester, Mass., a corporation of Massachusetts
No Drawing. Filed Feb. 16, 1965, Ser. No. 433,167
3 Claims. (Cl. 260—79.1)

ABSTRACT OF THE DISCLOSURE

Thianthrene ring formation in the Macallum type formation of polyphenylene sulfide resins, where unsymmetric halogen tri-substituted aromatic compounds are employed, is avoided by the inclusion, in the reactants, of an alkyl substituted aromatic hydrocarbon such as toluene, xylene, cumene, mesitylene, methyl naphthalene, and ethyl methyl benzene.

---

This invention is an improvement in aromatic sulfide resins consisting of chains made up of aromatic units alternating with sulfur atoms made from starting materials including unsymmetric halogen tri-substituted aromatic compounds.

It has been found that the use of unsymmetric halogen tri-substituted aromatic compounds in producing resins of the type disclosed in Macallum Patent 2,538,941 does not result in maximum cross-linking efficiency. This is mainly due to cyclization or formation of thianthrene type rings which results in the formation of difunctional units of the following structure:

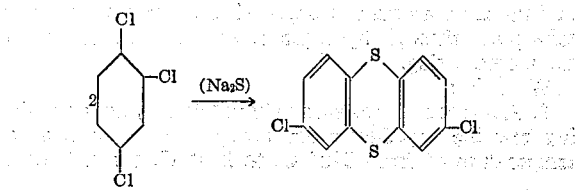

Such reaction necessarily leads to a poor distribution of cross-linking sites resulting in lower strength materials.

We have discovered that resins of improved strength can be achieved by addition of alkyl substituted hydrocarbon aromatic compounds to the reaction mix used in making the aromatic sulfide resins. Materials of this type which are employed, according to the teachings of our invention, are toluene, o, m, and p xylene, cumene, mesitylene, methyl naphthalene, and ethyl methyl benzene. In general, any alkyl substituted benzene hydrocarbon containing at least one substituted alkyl group and wherein the substitutent groups each contain from one to three carbon atoms is suitable. We are of the opinion that the use of such additives to the reaction mix inhibits or entirely eliminates the formation of the thianthrene type ring structures. The resins produced by the use of the modifier taught herein are demonstrally stronger than a resin similarly prepared but without addition of the modifier.

The teachings of the present invention are applicable to the resins and methods of Malcallum Patents 2,513,188 and 2,538,941, and they are applicable to the catalyzed resin systems taught in Roscoe A. Pike's U.S. Patent Application Ser. No. 322,493, filed on Nov. 8, 1963, now U.S. 3,285,882, and to the triazine modized aromatic sulfide resins taught in Application Ser. No. 322,507, filed Nov. 8, 1963, by Roscoe A. Pike, now U.S. 3,303,170. Patent Application Ser. No. 433,200, filed even date herewith by Martin and Pike entitled Reinforced Poly (Arylene Sulfide) Polymers discloses methods of improving the properties of aromatic sulfide resins by the addition of certain fillers. The present invention is also applicable to the resin systems disclosed in that application.

Although we disclose the use of chlorinated compounds in the syntheses described in the illustrative examples in this specification it is known that bromine derivatives are as suitable. Iodine substituted materials are also perfectly suitable but such derivatives are less available than the chlorinated and brominated forms. In the examples we generally employ the preferred catalysts, such as taught in the prior application of Roscoe A. Pike and we employ the preferred fillers of the prior application of both inverters, referred to above. It should be understood however, that other catalysts, or non catalysts, may be employed and that other fillers, or no fillers may be employed in practising the present invention which relates, solely, to the use of certain hydrocarbon aromatic additives in the production of aromatic sulfide resins, and to the resins thus produced.

The resins of this invention are formed by heating sulfur with sodium carbonate or an alkali metal or alkaline earth metal carbonate, oxide, or sulfide, with halogenated aromatic compounds, including at least one nuclearly halogen tri-substituted aromatic compound and an alkyl substituted aromatic compound of the class described. The heating is carried out under autogenous pressure from 270° C to 360° C. for 3 to 5 hours, with a catalyst, or for 20 hours without a catalyst.

The modifiers of the present invention being effective to prevent thianthrene ring formation associated with the use of unsymmetrically halogen tri-substituted aromatics, are employed in amounts determined by the amount of such unsymetrically tri-substituted materials present in the reaction mixture. The modifiers are effective in the range of from .02 mole of modifiers per mole of unsymmetrically tri-substituted compound to 3 moles of modifier per mole of the tri-substituted compound. The preferred range is from 0.2 mole per mole to 1.5 moles per mole. Toluene and xylene, because of their low molecular weight and economy are preferred as modifiers, but the more highly substituted and ethyl substituted materials referred to previously are equally effective when employed in equal amounts on a molal basis.

EXAMPLE I

This example illustrates a process for making an alkyl aromatic modified resin of our invention without the addition of filler material.

In a ceramic ball mill 22.0 g. sulfur, 70.0 g. sodium carbonate, 75.0 g. p-dichlorobenzene (20 g. excess), and 2.8 g. N-bromosuccinimide were well mixed. The mixture was placed into a mortar and well blended with 6.0 g. toluene and 10.0 g. of 1,2,4-trichlorobenzene. The resulting mixture was charged into a 500 cc. steel pressure vessel, sealed with a polytetrafluroethylene gasket, and heated at 300° C. for five hours. After cooling and releasing the pressure developed, the solid slug of resin was removed from the glass liner, ground to a fine powder, and successively extracted with hot water, methanol, tetralene, and di-isopropyl ether, then dried in a vacuum oven (1 mm. Hg) at 100° C. for eight hours to give 40.0 g. resin.

EXAMPLE II

This is illustrative of the procedure for making a filler containing resin of the present invention.

In a ceramic ball mill 22.0 g. sulfur, 70.0 g. sodium carbonate, 75.0 g. p-dichlorobenzene (20 g. excess), 2.8 g. N-bromosuccinimide, and 80.0 g. alpha-alumina were well mixed. This mixture was placed into a mortar and blended with 6.0 g. toluene and 10.0 g. 1,2,4-trichlorobenzene. This resulting mixture was then charged to a glass liner which was inserted into a 500 cc. steel pressure vessel, sealed with a polytetrafluroethylene gasket, and heated at 300° C. for five hours. After cooling and releasing the pressure developed, the solid slug of resin was removed from the glass liner, ground to a fine powder, and successively extracted with hot water and methanol. The resin was then refluxed for one hour in 1,2,3,4-tetrahydronaphthalene and filtered. After drying with methanol, the resin was placed into a ceramic ball mill and ground very finely, then successively extracted with hot 1 N hydrochloric acid and methanol, then refluxed again in 1,2,3,4-tetrahydronaphthalene and filtered. It was then dried by filtering through hot methanol and di-isopropyl ether, and dried in a vacuum oven (1 mm. Hg) for eight hours to give 105.0 g. resin. By combustion at 600° C. for five hours, the product was found to have a weight ratio of alumnia to resin of 81 to 19.

Copending application Ser. No. 322,507, filed Nov. 8, 1963, by Roscoe A. Pike, discloses a poly(phenylene sulfide) resin which is a cross-linked polymer but which employs symmetrically halogen tri-substituted monomers which are not subject to thianthrene ring formation, as is a material such as 1,2,4-trichlorobenzene. By the use of the aklyl substituted aromatic addition agents of the present invention, heat stability of the resin product equivalent to that resulting from the use of symmetrically halogen tri-substituted materials can be achieved. This is illustrated by the following results in which 3.0 g. resin samples were heated in 50 ml. breakers in an air oven at the indicated temperatures. Example III is an example of the type of resin employing a tri-substituted monomer which does not form thianthrene rings, Example IV is an example of the use of a tri-substituted monomer which does form thianthrene rings, and Examples V and VI are examples of the present invention made in accordance with Examples I and II, above respectively.

TABLE I.—HEAT STABILITY OF PHENYLENE SULFIDE RESIN SYSTEMS

| Polymer Made From— | Percent Weight Loss After— | | | | Total |
| --- | --- | --- | --- | --- | --- |
| | 24 hrs. at 250° C. | 72 hrs. at 300° C. | 24 hrs. at 350° C. | 24 hrs. at 400° C. | |
| Ex. III ____ 2.7 g. pdb,[1] 0.5 g. pct[2]_____ | 0.0 | 3.3 | _____ | 5.3 | 8.6 |
| Ex. IV ____ 2.7 g. pdb, 0.5 g. 1,2,4 tcb [3]_____ | 0.5 | 3.9 | _____ | 14.9 | 19.3 |
| Ex. V _____ 2.7 g. pdb, 0.5 g. 1,2,4 tcb, 0.3 g. toluene_____ | 0.5 | 6.4 | 1.9 | 3.2 | 12.0 |
| Ex. VI ____ 2.7 g. pdb, 0.5 g. 1,2,4, tcb, 0.3 g. toluene, Al₂O₃ to give 80/20 Al₂O₃/resin system. | 0.1 | 0.8 | 0.3 | 2.7 | 3.9 |

[1] p-Dichlorobenzene.  [2] p-Chlorophenyltriazine.  [3] 1,2,4-trichlorobenzene.

Table II compares the alkyl aromatic modified resins of the present invention with other poly(phenylene sulfide) resins in terms of flexural strength measurements on alumina-resin systems. Example VII employs a tri-substituted aromatic which tends to form thianthrene rings and does not employ any alkyl aromatic modifier. Example VIII is a toluene modified resin of the present invention. Example IX employs a non-thianthrene ring forming triazine material, and Example X employs para-xylene in accordance with the teachings of the present invention. The superiority of the resins of this invention over the unmodified resin, and its parity with the more expensive triazine modified system, in terms of strength, are evident from the table. All the resins were made in accordance with the procedures in Example II in which the alumina is added to the reaction mix. The reaction times and the catalyst employed were as specified in detail in Example II. The filler to resin ratio was determined by combustion of a portion of the resin at 600° C. for five hours in air. The flexural strengths were run on 1¼″ diameter by 0.075″ thick discs at room temperature. The discs were molded from the resin powder at 5,000 p.s.i., 275° C. for one half hour. They were then post-cured for three hours at 150° to 250° C., and two hours at 300° to 350° C. in an air oven.

TABLE II.—FLEXURAL STRENGTHS OF ALUMINA REINFORCED POLYPHENYLENE SULFIDE RESIN SYSTEMS

| Polymer Made From— | Ratio of Al₂O₃/ Resin | Flexural Strength |
| --- | --- | --- |
| Ex. VII ____ 0.5 g. 1,2,4,-trichlorobenzene, 2.7 g. p-dichlorobenzene. | 75/25 | 5,800 |
| Ex. VIII ___ 0.5 g. 1,2,4,-trichlorobenzene, 2.7 g. p-dichlorobenzene, 0.3 g. toluene. | 82/18 | 19,000 |
| Ex. IX ____ 0.5 g. 2,4,6-tris-p-chlorophenyltriazine, 2.7 g. p-dichlorobenzene. | 77/23 | 15,500 |
| Ex. X _____ 0.5 g. 1,2,4-trichlorobenzene, 2.7 g. p-dichlorobenzene, 0.15 g. p-xylene. | 73/27 | 10,400 |

In order to show the effect on flexural strength of varying the amount of alkyl aromatic modifier, the procedure of Example II was followed with the modifier amount being varied as indicated in Table III.

TABLE III

| Grams of toluene per 100 grams of 1,2,4-trichlorobenzene: | Flexural strength [1] |
| --- | --- |
| 30 | 16,600 |
| 60 | 18,900 |
| 120 | 9,300 |

[1] Pounds per square inch.

It is believed that the alkyl aromatic units perform the desired function in the resins of this invention by reaction of an aromatic sulfur with the alkyl group to form a sulfur linkage between an aromatic group in the polymer and the alkyl aromatic compound. Further reaction may take place through hydrogen replacement by sulfur on the aromatic ring.

We claim:

1. A method of making a poly sulfide polymer comprising reacting together under autogenous pressure at a temperature of from 270° C. to 360° C. for at least 3 hours: sulfur, a compound selected from the group consisting of alkali metal and alkaline earth metal carbonates, sulfides, and oxides; an unsymmetrically nuclearly halogen tri-substituted benzene, said halogen being selected from the group consisting of chlorine, bromine, and iodine and an aromatic hydrocarbon compound selected from the group consisting of benzene and naphthalene having only from 1 to 3 nuclear substituents selected from the group consisting of methyl, ethyl, and propyl radicals, said aromatic compound being present in the amount of from 0.02 to 3 mols for each mol of halogen tri-substituted benzene.

2. A method as in claim 1 in which the said aromatic compound is toluene or xylene.

3. The polymeric product of a method defined in claim 1.

References Cited

UNITED STATES PATENTS

| | | | |
|---|---|---|---|
| 2,341,453 | 2/1944 | Lieber et al. | 260—79.1 |
| 3,268,504 | 8/1966 | Harris et al. | 260—79 |
| 2,513,188 | 6/1950 | Macallum | 260—79.1 |
| 2,538,941 | 1/1951 | Macallum | 260—79.1 |
| 3,219,638 | 11/1965 | Warner | 260—79.1 |

FOREIGN PATENTS 6,412,909  5/1967  Netherlands.

OTHER REFERENCES

Lentz et al.; Journal of Polymer Science, "Phenylene Sulfide Polymers," vol. 43, pp. 167–180, 1960, Scientific Library QD 281 P6J6.

DONALD E. CZAJA, *Primary Examiner.*

L. J. BERCOVITZ, *Examiner.*

M. I. MARQUIS, *Assistant Examiner.*